(12) United States Patent
Lee

(10) Patent No.: US 7,794,572 B2
(45) Date of Patent: Sep. 14, 2010

(54) WATER PURIFICATION APPARATUS

(75) Inventor: Hsin-Ho Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1096 days.

(21) Appl. No.: 11/438,024

(22) Filed: May 19, 2006

(65) Prior Publication Data

US 2007/0062799 A1    Mar. 22, 2007

(30) Foreign Application Priority Data

Sep. 16, 2005   (CN) .................. 2005 1 0037340

(51) Int. Cl.
- *B01D 3/04* (2006.01)
- *C02F 1/04* (2006.01)
- *C02F 1/14* (2006.01)
- *F24J 2/12* (2006.01)
- *F24J 2/32* (2006.01)
- *F28D 15/02* (2006.01)

(52) U.S. Cl. ............ 202/234; 126/635; 126/684; 159/903; 165/104.11; 165/104.15; 165/48.2; 202/188; 202/237; 203/10; 203/DIG. 1

(58) Field of Classification Search .......... 126/635, 126/684; 159/903; 165/104.11, 104.15, 165/48.2; 202/188, 234, 237; 203/10, DIG. 1
See application file for complete search history.

(56) References Cited

U.S. PATENT DOCUMENTS

| | | | | |
|---|---|---|---|---|
| 2,141,330 A | * | 12/1938 | Abbot | 202/180 |
| 3,300,393 A | * | 1/1967 | Fisher | 203/10 |
| 3,390,672 A | * | 7/1968 | Snelling | 126/636 |
| 3,490,996 A | * | 1/1970 | Kelly, Jr. | 202/234 |
| 3,875,926 A | * | 4/1975 | Frank | 126/635 |
| 4,217,882 A | * | 8/1980 | Feldman, Jr. | 126/636 |
| 5,242,548 A | * | 9/1993 | Youngner | 202/185.1 |
| 6,274,004 B1 | * | 8/2001 | Andersen | 202/234 |
| 6,342,127 B1 | * | 1/2002 | Possidento | 202/234 |
| 7,213,637 B2 | * | 5/2007 | Lin et al. | 165/104.26 |

FOREIGN PATENT DOCUMENTS

CN        2632066        8/2004

* cited by examiner

*Primary Examiner*—Virginia Manoharan
(74) *Attorney, Agent, or Firm*—Jeffrey T. Knapp

(57) ABSTRACT

A water purification apparatus (10) includes an evaporating chamber (13), a light concentrator (11), and a heat pipe (12). The evaporating chamber is for containing impure water. The evaporating chamber has a connecting opening (134) and a vapor outlet (131). The light concentrator is for concentrating sunshine. The heat pipe has an evaporating section (121) and a condensing section (122). The evaporating section is irradiated by the concentrated sunshine, and the condensing section is disposed in the evaporating chamber through the connecting opening.

2 Claims, 2 Drawing Sheets

WATER PURIFICATION APPARATUS

TECHNICAL FIELD

The present invention generally relates to desalinating or purifying water and, more particularly, to a freshwater generating apparatus.

BACKGROUND

More than 70 percent of the earth's surface is covered by water. However, most of the water is seawater, which cannot be drunk as its salt content is too high. Therefore, freshwater or drinking water is very scarce. Desalinating or purifying the seawater is a solution for getting freshwater or drinking water. Generally, the seawater is desalinated by chemical subtraction, electrically-powered distillation, or solar-powered distillation. Chemical subtraction and electrically-powered distillation are prohibitively expensive due to the volume of material and power required. Therefore solar-powered distillation is the method most commonly used in desalinating seawater.

Solar-powered distillation operates by solar-powered distillation evaporating seawater using solar energy. As the water evaporates it leaves behind its salt content, the vapor can then be cooled, for example by using a condenser, producing purified water that can be drunk or used in agriculture. A typical solar-powered distillation method for desalinating seawater uses a large greenhouse-like structure having a transparent walls and roof. The solar energy transmits the transparent walls, and heats seawater contained in the green house. The seawater evaporates, and the vapor is cooled to form a supply of purified water. However, the large greenhouse uses too much space and has a low heating efficiency.

China patent No. 01137342.3 discloses an apparatus for desalinating seawater using evacuated solar collector tubes. The seawater is fed into the collector tubes, solar energy is then concentrated on the collector tubes and the seawater in the collector tubes is heated to vapor. This vapor is then cooled to form pure water. This apparatus has good heating efficiency, but the salt in the seawater is deposited on the inner surface of the collector tubes, decreasing the heating efficiency of the collector tubes, and shortening the useful lifetime of the collector tubes.

Therefore, a water purification apparatus which can overcome the above-described problems is desired.

SUMMARY

In one embodiment thereof, a water purification apparatus includes an evaporating chamber, a light concentrator, and a heat pipe. The evaporating chamber is for containing impure water. The evaporating chamber has a connecting opening and a vapor outlet. The light concentrator is for concentrating sunshine. The heat pipe has an evaporating section and a condensing section. The evaporating section is irradiated by the concentrated sunshine, and the condensing section is positioned in the evaporating chamber through the connecting opening.

Other advantages and novel features will become more apparent from the following detailed description when taken in conjunction with the accompanying drawings.

BRIEF DESCRIPTION OF THE DRAWINGS

Many aspects of the water purification apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE EMBODIMENT

Figure 1:
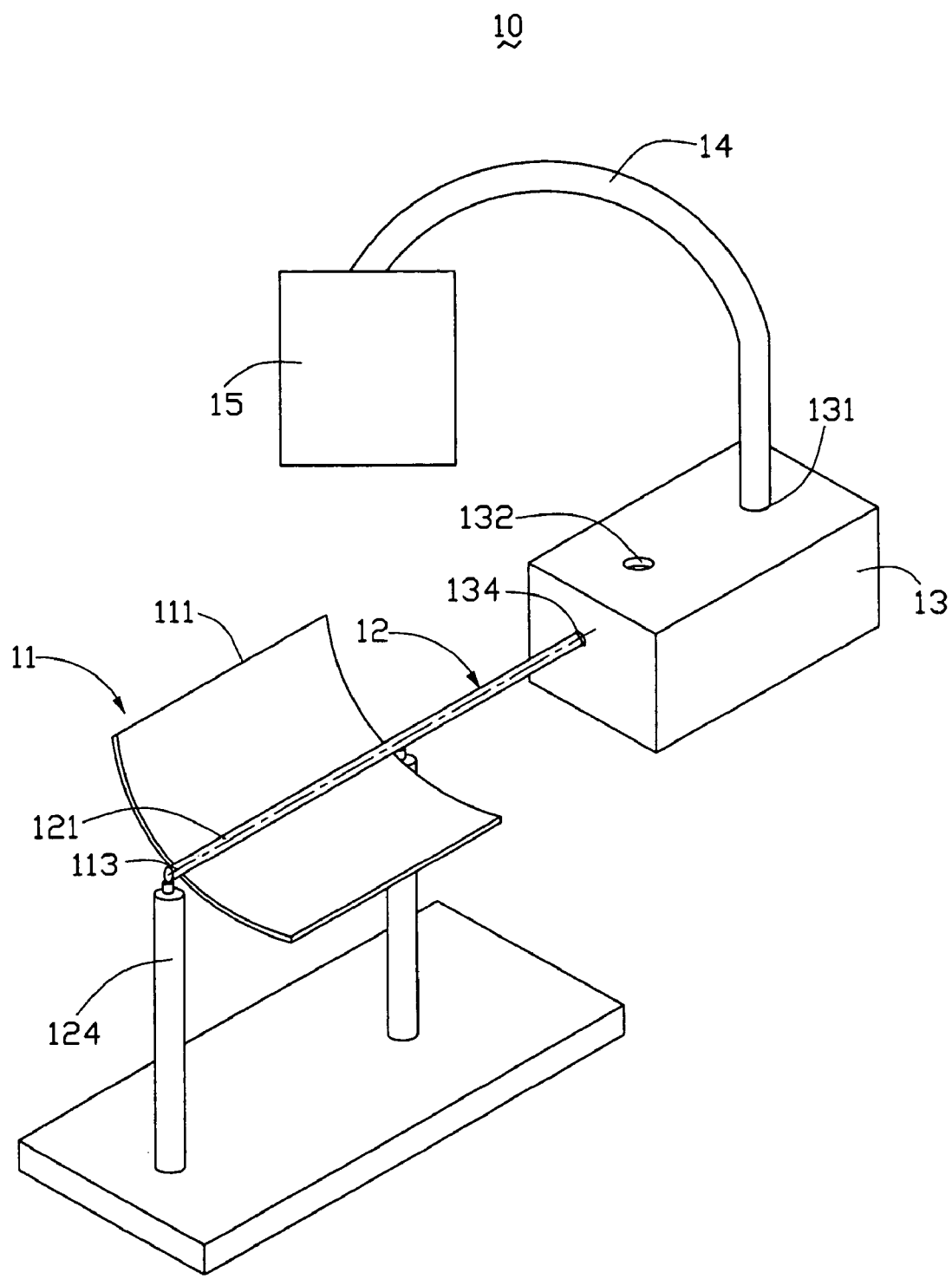
FIG. 1 is a schematic view of a water purification apparatus in accordance with a preferred embodiment.
Figure 2:
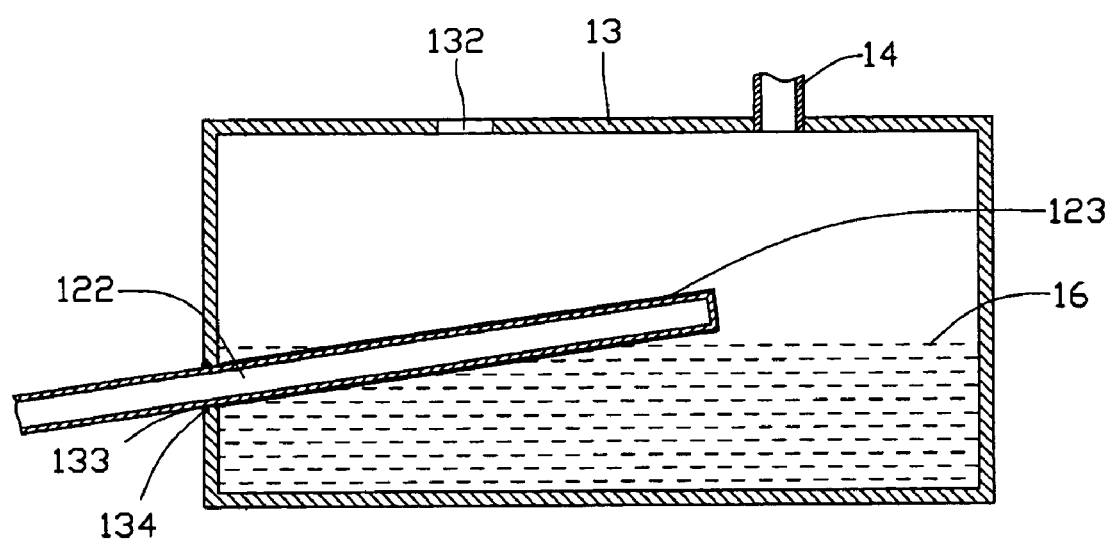
FIG. 2 is a schematic, cut away view of the evaporating chamber in FIG. 1.

Referring to FIGS. 1-2, in a preferred embodiment, a water purification apparatus 10 includes a light concentrator 11, a heat pipe 12, an evaporating chamber 13, a vapor passage 14, and a cooling mechanism 15.

The light concentrator 11 includes at least one parabolic reflector 111 for concentrating sunshine. The light concentrator 11 has a focus line 113. The reflector 111 can concentrate sunshine onto the focus line 113.

The heat pipe 12 includes an evaporating section 121 and a condensing section 122. The evaporating section 121 is disposed at the focus line 113 of the light concentrator 11, to allow its irradiation with concentrated sunshine. The condensing section 122 is positioned in the evaporating chamber 13. A carbon nanotube layer 123 is formed on a surface of the condensing section 122 of the heat pipe 12. The heat pipe 12 is supported with a supporting bracket 124.

The evaporating chamber 13 is used for containing impure water 16. The impure water 16 can be seawater, or other foul water. A vapor outlet 131 and a water entrance 132 are formed on the top of the evaporating chamber 13. A connecting opening 133 is formed on a side wall of the evaporating chamber 13. The heat pipe 12 is settled into the evaporating chamber 13 through the connecting opening 133. A seal element 134 is disposed in the connecting opening 133 for preventing vapor in the evaporating chamber 13 venting through the connecting opening 133. One end of the vapor passage 14 is connected to the vapor venting opening 131. The other end of the vapor passage 14 is connected to the cooling mechanism 15.

During operation of the water purification apparatus 10, the impure water is introduced into the evaporating chamber 13 through the water entrance 132, and the condensing section 122 of the heat pipe 12 is dipped in the impure water 16. The water entrance 132 is then sealed. The light concentrator 11 concentrates sunshine on the evaporating section 121 of the heat pipe 12, and the heat pipe 12 absorbs the solar energy of the sunshine. The solar energy absorbed by the heat pipe 12 is transferred to the condensing section 122 of the heat pipe 12. Because the carbon nanotube layer 123 formed on the surface of the condensing section 122 has a relatively large specific surface area, the carbon nanotube layer 123 can rapidly heat a relatively large volume of the impure water 16 to vapor. The vapor is vented into the vapor passage 14 through the vapor outlet 131. The vapor is then cooled to form purified water in the cooling mechanism 15.

When the carbon nanotube layer 123 is partially dipped into the impure water 16 the carbon nanotube layer 123 can soak up or absorb the impure water 16 allowing it to cover areas of the carbon nanotube layer 123 above the water-level of the impure water 16 because of capillary action. The impure water 16 which is soaked up to an upper part of the carbon nanotube layer 123 can be evaporated more quickly, because the water will have a much greater evaporating area.

Therefore, the fastest evaporating rate can be got when the carbon nanotube layer 123 is partially dipped in the impure water 16.

Understandably, a water level detector can be disposed in the evaporating chamber 13 for detecting the water level of the impure water. The light concentrator can be another variety of concentrator, such as a rotated parabolic concentrator. More than one light concentrator and heat pipe can be used at the same time for accelerating the evaporating rate.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A water purification apparatus, comprising:
    an evaporating chamber for containing impure water, the evaporating chamber having a connecting opening and a vapor outlet;
    a curved light concentrator for concentrating sunlight;
    a heat pipe having an evaporating section and a condensing section, the evaporating section being arranged to be irradiated by the concentrated sunlight, the condensing section being disposed in the evaporating chamber through the connecting opening;
    a carbon nanotube layer formed on a surface of the condensing section of the heat pipe; and
    a cooling mechanism connected to the vapor outlet wherein the vapor outlet is formed on the top of the evaporating chamber, the light concentrator comprising a parabolic reflector for concentrating sunlight onto a focus line; the evaporating section is disposed at the focus line of the light concentrator.

2. An apparatus for evaporating a liquid, the apparatus comprising:
    an evaporating chamber for containing the liquid, the evaporating chamber having a connecting opening and a vapor outlet;
    a curved light concentrator for concentrating sunlight;
    a heat pipe having an evaporating section and a condensing section, the evaporating section being arranged to be irradiated by the concentrated sunlight, the condensing section being disposed in the evaporating chamber and at least partially dipped in the liquid so that when the heat pipe transfers heat of the focused sunlight from the evaporating section to the condensing section thereof, the heat evaporates the liquid out of the evaporating chamber through the vapor outlet thereof; and
    a carbon nanotube layer formed on a surface of the condensing section of the heat pipe;
    wherein the condensing section is arranged such that an end portion of the condensing section is higher than a liquid level; the light concentrator comprising a parabolic reflector for concentrating sunlight onto a focus line; the evaporating section is disposed at the focus line of the light concentrator.

* * * * *